United States Patent Office 2,925,443
Patented Feb. 16, 1960

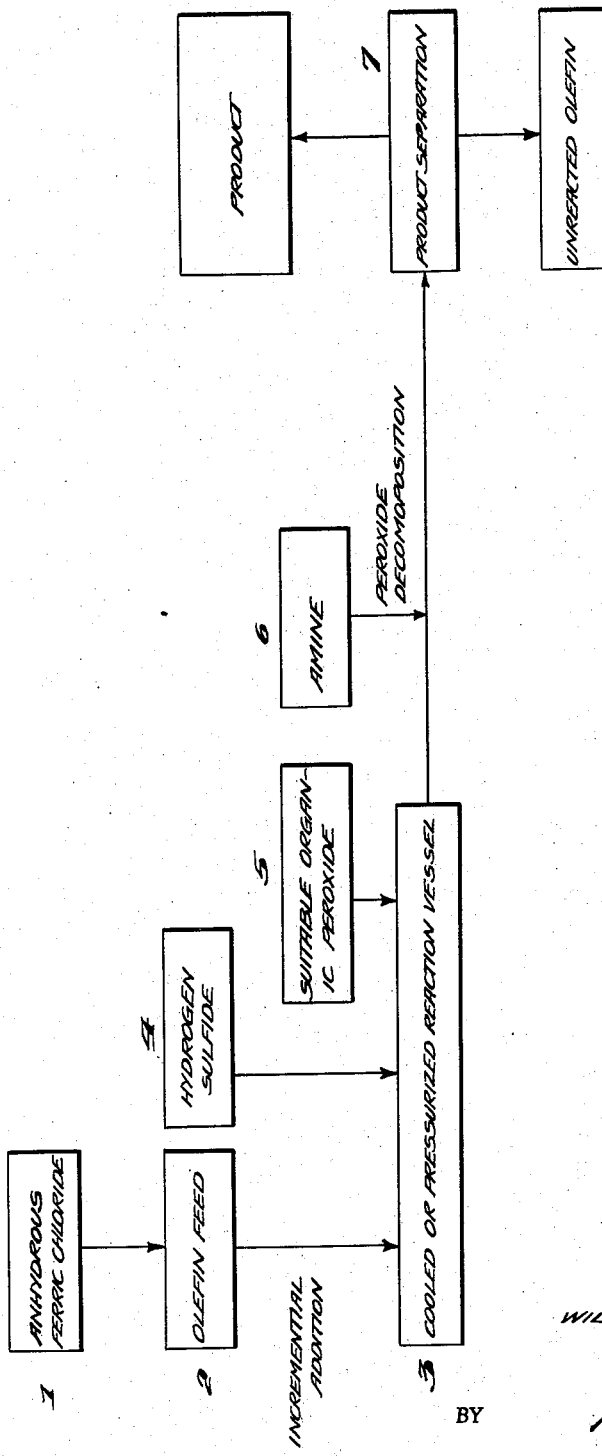

2,925,443

PROCESS FOR PREPARING MERCAPTANS

William L. Walsh, Glenshaw, Pa., assignor to Gulf Research & Development Company, Pittsburgh, Pa., a corporation of Delaware Application June 6, 1957, Serial No. 664,087

5 Claims. (Cl. 260—609)

This invention relates to the preparation of primary and/or secondary mercaptans by the reaction of olefins and hydrogen sulfide in the presence of a catalyst. More particularly the invention relates to the preparation of mercaptans by the reaction of olefins with hydrogen sulfide in the presence of specific catalysts and under carefully controlled conditions.

Several methods of preparing mercaptans have been disclosed in the literature. The first reported synthesis involved contacting sodium ethyl sulfate with an aqueous solution of sodium hydrosulfide. Other alkylating agents such as alkyl halides will react similarly. Mercaptans can also be prepared by the cleavage of disulfides with metallic sodium or the treatment of Grignard reagents with sulfur. If hydrogen sulfide is added to propylene, isopropyl mercaptan is the product normally obtained as would be expected in accordance with Markownikoff's rule. Primary and secondary mercaptans, however, are not normally recovered in the last-mentioned procedure. Processes which direct the addition of hydrogen sulfide to olefins on the double bond carbon atoms contrary to Markownikoff's rule are of commercial interest because the products are primary mercaptans. These mercaptans are useful in preparing synthesized thioester type synthetic lubricants and have other petrochemical applications.

I have found that substantial amounts of primary and/or secondary mercaptans can be obtained by a process which comprises reacting an olefin with hydrogen sulfide in the presence of an organic peroxide and an iron chloride catalyst. Hydrogen sulfide must be present in the liquid phase and in excess during the reaction and it is absolutely necessary that the catalyst employed with the organic peroxide be iron chloride. The addition of the hydrogen sulfide to the olefin under the conditions of the present invention takes place contrary to Markownikoff's rule.

A preferred method of carrying out the process in accordance with my invention is shown in Fig. 1, which is hereby included in the specification.

As shown in the drawing, in the first step anhydrous ferric chloride or ferrous chloride 1 is added to the olefin feed 2 and a precipitate is formed. The solution obtained which comprises the olefin and an iron chloride-olefin complex, is separated from the precipitate. Liquid hydrogen sulfide 4 and a suitable organic peroxide 5 are added to a cooled or pressurized reaction vessel 3. The ferric chloride-olefin solution is advantageously added incrementally to the sulfide-peroxide mixture in order to obtain the desired results in accordance with this process.

The olefin feed can be any olefin, preferably one having a terminal unsaturated carbon atom, or a mixture of these olefins. Thus olefins containing about three to about fifty carbon atoms in the molecule, for example, pentene, octene-1, diisobutylene, decene, docene, pentadecylene, tetracontene, etc. are satisfactory feeds. The preferred feed is an olefin with about five to about twenty carbon atoms in the molecule. Examples of olefins which can be used include propylene, butylene, pentene, hexene, octene-1, diisobutylene, pentadecylene, eicosene, etc.

The yield of mercaptan is improved if the iron chloride is anhydrous and is present in the amount of maximum solubility in the olefin. Thus a mixture of about one-tenth percent to about five percent by weight of iron chloride based on the olefin is satisfactory. A five percent mixture is preferred in the preparation from octene-1, for example, since this assures saturation of the olefin with the chloride.

The ordinary olefin which is exposed to air during storage contains peroxide formed autogenously, and of course, these peroxides are suitable catalysts for the addition reaction. However, since the amount of peroxide formed may not be sufficient, some peroxides have to be introduced to the reaction mixture to insure the proper catalyst concentration.

The peroxide catalyst must be present or satisfactory yields of mercaptans are not recovered. Best results are obtained when the concentration of peroxide is at least about five-tenths percent by volume of the olefin feed, but no higher than about eight percent by volume based on the olefin feed, since amounts in excess thereof merely increased the yield of disulfide without improving the yield of the mercaptan. Examples of suitable peroxides are the peroxides of unsaturated organic compounds, such as the peroxides of ethers, ketones, aldehydes, for example, methylether peroxide, methylethyl ketone peroxide, acetone peroxide, acetaldehyde peroxide, etc. or the aromatic peroxides, for example, benzoyl peroxide, terpene peroxide, tetraline peroxide, cumene hydroperoxide, diisopropylbenzene hydroperoxide, paramethane hydroperoxide, etc. The preferred peroxide for low temperature operation is methylethyl ketone peroxide; for high pressure reactions the preferred peroxide is cumene hydroperoxide. Sufficient peroxide should be added to give a resulting concentration of about five-tenths percent to about eight percent peroxide by volume to the olefin feed, preferably about two to about four percent of the olefin feed.

The reaction takes place in the liquid phase and the hydrogen sulfide must be kept in the liquid phase in order to keep it present in excess in the reaction mixture. This may be merely to assure that the yield of mercaptan will predominate over the yield of disulfide as a result of operation of the law of mass action. It is more probable, however, that the excess hydrogen sulfide acts as a solvent for the mercaptan formed and withdraws it from contact with the olefin. A molecular excess of about 250 to 400 percent over the stoichiometric amount required for the reaction is satisfactory. A molecular excess of 300 percent over the stoichiometric amount required for the reaction is preferred for a room temperature high pressure operation and an excess of 350 percent over the stoichiometric amount for the reaction run below the normal boiling point of hydrogen sulfide. The pressure depends upon whether the reaction is carried out at a temperature below the normal boiling point of hydrogen sulfide or at room temperature. If the reaction is carried out below the normal boiling point of hydrogen sulfide satisfactory pressures would be from about 700 millimeters of mercury to about two atmospheres, preferably about one atmosphere. A suitable temperature range in this case would be from about —90° C. to about —70° C. If the reaction is carried out under pressure, the pressure must be sufficient to liquefy the hydrogen sulfide, a satisfactory pressure being about 250 pounds per square inch gauge to about 450 pounds per square inch gauge preferably about 400 pounds per square inch gauge. Temperature from about 20° to 40° C. in this case would be satisfactory, preferably about 25° C. Temperatures above 40° C. are ordinarily not desirable in cases where they might have an adverse effect on the equilibrium between the mercaptan, the olefin, and hydrogen sulfide.

The optimum yield of mercaptan is recovered if sufficient iron chloride catalyst is added to saturate the olefin with the chloride. Since concentrated solutions of the chloride in the olefin can be easily prepared, the olefin and iron chloride catalyst are conveniently added together. This addition can be accomplished by the addition preferably in incremental amounts of about one-half percent of the total, at one minute intervals over a period of about one-half hour when the reaction is run at a temperature below the boiling point of hydrogen sulfide. If the reaction is run under pressure, the mixture can be added in increments of about five percent of the total at ten minute intervals over a period of one hour. The solution of iron chloride in olefin may be added to the pressurized vessel by forcing the liquid into the vessel with nitrogen under higher pressures.

In the second step of the low temperature reaction, the mixture is stirred for an additional half hour and the peroxide still present is advantageously, though not necessarily destroyed in any convenient manner as some reaction with the peroxide apparently can take place to a small extent during the warming up of the mercaptan product mixture from −60° C. to room temperature, which leads to the production of disulfides since the hydrogen sulfide evaporates and leaves an excess of olefins. The peroxide can be destroyed when the reaction is carried out at low temperature, by the addition as shown by reference numeral 6, of any reducing agent such as any amine having two to six carbon atoms in the molecule, for example, propylamine, propylene diamine, n-butyl amine, tertiary amylamine, p-amylamine, n-hexylamine, etc., preferably propylene diamine. The amine is added to give an amine concentration of about one-tenth to five percent in the solution, preferably about five-tenths percent.

In the last step the separation of the mercaptan from the by-products is completed by any conventional means at 7, as for example by distillation of the reaction mixture at a temperature of about 199° C. and a pressure of about one atmosphere, or chromatography on alumina using isopentane as an eluent can be used to effect the separation.

The procedure described hereinabove is representative of one possible process under the invention and therefore I have no intention of limiting the invention thereto.

The following examples further illustrate specific embodiments of the invention.

*Example 1*

A charge of 200.0 grams of methylal was placed in a one liter three-necked flask equipped with a stirrer, Dry Ice condenser, thermometer, and dropping funnel. The flask was placed in a Dry Ice-acetone bath, which cooled the methylal to −70° C., four mols of hydrogen sulfide and four grams of a 60 percent solution of methylethyl ketone peroxide in dimethyl phthalate were added to the methylal at this temperature. The chloride catalyst (3 grams of anhydrous ferric chloride) was added to 112 grams of octene-1 and a precipitate was obtained in a solution comprising the olefin and an iron-chloride-olefin complex. The precipitate was removed and the solution added dropwise in one milliliter increments to the methylal-hydrogen sulfide mixture over a period of about one-half hour. The reaction mixture was stirred for an additional half hour and ten grams of propylene-diamine was added to the solution to destroy any remaining peroxides. The reaction mixture was allowed to warm to room temperature and the methylal removed by distillation. The remaining liquid was fractionated and the products recovered. A 60 percent yield of primary octyl mercaptan and six percent normal dioctyl sulfide was recovered. This yield is based on the 1-olefin content of the octene-1 charged. Approximately 28 percent of the octene-1 was recovered unreacted.

These data illustrate a typical low temperature reaction. A substantial yield of primary mercaptan results when the reaction is carried out under these conditions.

*Example 2*

The effect of solvent on the mercaptan yield and on the distribution of mercaptan and disulfide in the product was investigated.

The reaction was run under conditions identical to the conditions used in Example 1, except that the reaction was carried out in the absence of the methylal solvent. A yield of 51 percent primary octyl mercaptan and five percent normal dioctyl sulfide was recovered.

Comparison of these data with the data in Example 1 indicates that a slight improvement in the yield of mercaptan and ratio of mercaptan to disulfide in the product can be expected if the reaction is carried out in the presence of methylal, acetal, ethylal, etc. as solvents.

*Example 3*

Diethylether was evaluated as a solvent and its effect on the mercaptan yield and distribution of mercaptan and disulfide in the product was verified.

The reaction was run under conditions identical with those of Example 1 except that 200 grams of diethylether was substituted for the 200 grams of methylal as a solvent. A yield of 27 percent primary octyl mercaptan and eight percent normal dioctyl sulfide was recovered.

These data indicate that diethylether is not an extremely good solvent medium for the reaction.

*Example 4*

The effect of concentration of ferric chloride was investigated by preparing a saturated solution of anhydrous ferric chloride in octene-1 and using this solution as a feed stock.

The methylal solvent (200 grams) was placed in a one liter three-necked flask equipped with a stirrer, Dry Ice condenser, thermometer and dropping funnel and cooled to −70° C. in a Dry-Ice-acetone bath. A charge of four mols of hydrogen sulfide and four grams of 60 percent solution of methylethyl ketone in dimethyl phthalate was added to the flask. A saturated solution of anhydrous ferric chloride in octene-1 was prepared by adding 24 grams of anhydrous ferric chloride to 120 grams of octene-1, stirring the mixture and filtering to remove the undissolved ferric chloride. This solution was placed in an addition tube and added to the peroxide hydrogen sulfide solution. The addition was made in one milliliter increments over a period of one-half hour. The reaction mixture was stirred for an additional half hour and ten grams of propylenediamine was added to the solution to destroy any remaining peroxides. The reaction mixture was then allowed to warm to 25° C., the methylal was removed by distillation and the remaining liquid fractionated.

A yield of 66 percent primary octyl mercaptan was recovered. The yield of normal dioctyl sulfide was four percent.

An improvement in the yield of normal octyl mercaptan and in the ratio of mercaptan to disulfide in the product is noted if the maxium amount of ferric chloride soluble in octene-1 is added as a catalyst.

These data demonstrate that an improved yield results when ferric chloride is added up to the saturation point of the ferric chloride in the olefin.

*Example 5*

The effect of the methylethyl ketone peroxide catalyst was determined by completing the reaction without the addition of peroxide.

A charge of 200 grams of methylal was placed in a one liter three-necked flask equipped with a stirrer, Dry Ice condenser, thermometer, and dropping funnel. The flask was placed in a Dry Ice-acetone bath which cooled the methylal to −70° C., four mols of hydrogen sulfide was passed into the methylal at −70° C. The chloride catalyst (3 grams of anhydrous ferric chloride) was added to 112 grams of octene-1 and a precipitate was obtained in a solution comprising the olefin and an iron chloride-olefin complex. The precipitate was removed and the solution added dropwise in one milliliter increments to the methylal-hydrogen sulfide mixture over a period of about one-half hour. The reaction mixture was stirred for an additional half hour and allowed to warm to room temperature. The methylal was removed by distillation and the remaining liquid fractionated. A yield of only one percent normal octyl mercaptan was recovered. A large part (95 percent) of the octene-1 was recovered unreacted.

It is apparent from the above that no appreciable addition of hydrogen sulfide to olefin takes place unless the peroxide catalyst is present.

*Example 6*

The effect of increasing the quantity of peroxide catalyst on the yield of mercaptan was evaluated. A charge of 200 grams of methylal was placed in a one liter three-necked flask equipped with a stirrer, Dry Ice condenser, thermometer and dropping funnel. The flask was placed in a Dry Ice-acetone bath which cooled the methylal to −70° C. A charge of four mols of liquid hydrogen sulfide was added to the methylal at this temperature, 16 grams of a 60 percent solution of methylethyl ketone peroxide in a dimethyl phthalate was added. The chloride catalyst (3 grams of anhydrous ferric chloride) was added to 112 grams of octene-1 and a precipitate was obtained in a solution comprising the olefin and an iron chloride-olefin complex. The precipitate was removed and the solution added dropwise in one milliliter increments to the methylal-hydrogen sulfide mixture over a period of about one-half hour. The reaction mixture was stirred for an additional half hour and 10 grams of propylenediamine was added to the solution to destroy any remaining peroxides. The reaction mixture was then allowed to warm to room temperature. The methylal was removed by distillation and the remaining liquid fractionated. A yield of 56 percent primary octyl mercaptan and one and one-half percent normal dioctyl sulfide was recovered.

No apparent improvement resulted from the fourfold increase in the amount of peroxide added, although possibly an improvement in the ratio of mercaptan to disulfide resulted.

The data presented in Examples 5 and 6 demonstrate that no appreciable reaction takes place unless the organic peroxide is present and indicates that the addition of peroxide in excess of the ratio of about 2 grams of peroxide per mol of hydrogen sulfide has no apparent beneficial effect on the mercaptan yield.

*Example 7*

Several runs were completed in which different catalysts were substituted for anhydrous iron chloride. The results were not satisfactory unless the catalyst was anhydrous iron chloride.

In the first of these runs a charge of 200 grams of methylal was placed in a one liter three-necked flask equipped with a stirrer, Dry Ice condenser, thermometer, and dropping funnel. The flask was placed in a Dry Ice-acetone bath, which cooled the methylal to −70° C., four mols of hydrogen sulfide and four grams of a 60 percent solution of methylethyl ketone peroxide in dimethyl phthalate was added to the methylal at this temperature. The chloride catalyst (3 grams of anhydrous aluminum chloride) was added to 112 grams of octene-1 and a precipitate was obtained in a solution comprising the olefin and an aluminum chloride olefin complex. The precipitate was removed and the solution added dropwise, in one mol milliliter increments to the methylal-hydrogen sulfide solution over a period of about one-half hour. The reaction mixture was stirred for an additional half hour and ten grams of propylenediamine was added to the solution to destroy any remaining peroxides. The reaction mixture was allowed to warm to room temperature and the methylal removed by distillation. The remaining liquid was fractionated and the products recovered. A yield of only one and three-tenths percent normal octyl mercaptan was recovered. No effort was made to determine the yield of disulfide since 80 percent of the octene-1 was recovered unreacted.

It is apparent from this data that anhydrous aluminum chloride does not effectively catalyze the addition of hydrogen sulfide to olefins under these conditions.

*Example 8*

The same amount of anhydrous magnesium chloride was substituted for anhydrous iron chloride in an effort to find another suitable catalyst.

A charge of 200 grams of methylal was placed in one liter three-necked flask equipped with a stirrer, Dry Ice condenser, thermometer, and dropping funnel. The flask was placed in a Dry Ice-acetone bath, which cooled the methylal to −70° C., and four mols of hydrogen sulfide and four grams of methylethyl ketone peroxide in dimethyl phthalate was added to the methylal at this temperature. The chloride catalyst, three grams of anhydrous magnesium chloride, was dissolved in 112 grams of octene-1 and this solution added dropwise, in one milliliter increments, to the methylal-hydrogen sulfide solution over a period of about one-half hour. The reaction mixture was stirred for an additional half hour and ten grams of propylenediamine was added to the solution to destroy any remaining peroxides. The reaction mixture was allowed to warm to room temperature and the methylal removed by distillation. The remaining liquid was fractionated and the products recovered. The yield of mercaptan was less than one percent and ninety-one percent of the octene-1 was recovered unreacted.

It is apparent from the above that magnesium chloride is not a satisfactory catalyst for the reaction and that iron chloride is necessary under the conditions outlined.

*Example 9*

Anhydrous stannic chloride was substituted for ferric chloride and the effect on the yield noted.

A three-necked flask equipped with a stirrer, Dry Ice condenser, thermometer, and dropping funnel was cooled in a Dry Ice-acetone bath to −70° C. and four mols of hydrogen sulfide was added to the flask along with four grams of a 60 percent solution of methylethyl ketone peroxide in dimethyl phthalate. The chloride catalyst (2 grams of anhydrous stannic chloride) was added to 112 grams of octene-1 and a precipitate was obtained in a solution comprising the olefin and a stannic chloride-olefin complex. The precipitate was removed and the solution added dropwise to the hydrogen sulfide-peroxide solution, incrementally over a period of one-half hour. The reaction mixture was stirred for an additional hour and ten grams of propylenediamine was added to the solution to destroy any remaining peroxide. The reaction mixture was allowed to warm to room temperature, the liquid fractionated and products removed. A yield of two percent mercaptan and one percent disulfide was recovered. More than one-half (53 percent) of octene-1 was recovered unreacted.

A comparison of this yield with the yield obtained when anhydrous ferric chloride was used under the same conditions (Example 2) indicates anhydrous stannic chloride is not a satisfactory catalyst for the reaction.

Example 10

Anhydrous magnesium chloride was substituted for ferric chloride to determine whether it would be an effective catalyst in a reaction where no solvent was present. A one liter three-necked flask equipped with stirrer, Dry Ice condenser, thermometer, and dropping funnel was cooled in a Dry Ice-acetone bath to $-70°$ C., and four mols of hydrogen sulfide was added to the flask along with four grams of a 60 percent solution of methylethyl ketone peroxide in dimethylphthalate. The chloride catalyst (2 grams of anhydrous magnesium chloride) was added to 112 grams of octene-1 and a precipitate was obtained in a solution comprising the olefin and a magnesium chloride-olefin complex. The precipitate was removed and the solution added dropwise in one milliliter increments to the hydrogen sulfide-peroxide solution over a period of about one-half hour. The reaction mixture was stirred for an additional half hour and ten grams of propylenediamine was added to the solution to destroy any remaining peroxides. The reaction mixture was allowed to warm to room temperature, the liquid fractionated and the product recovered.

No appreciable yield of normal octyl mercaptan or disulfide was recovered from this reaction. Essentially all (97 percent) of the octene-1 was recovered unreacted.

A comparison of this yield with the yield obtained when anhydrous ferric chloride was used as the catalyst under the same conditions (Example 2) shows anhydrous magnesium chloride is not a satisfactory catalyst for the reaction.

An examination of the data presented in Example 7 through Example 11 emphasizes the importance of an anhydrous iron chloride catalyst. None of the other chlorides effectively catalyze the addition of hydrogen sulfide to the olefin on the carbon atom to which the greatest number of hydrogen atoms is attached in contraposition to Markownikoff's rule.

Example 11

The effect of water of crystallization on the catalytic power of the iron chloride was investigated.

A charge of 100 grams of methylal was placed in a one liter three-necked flask equipped with a stirrer, Dry Ice condenser, thermometer, and dropping funnel. The flask was placed in a Dry Ice-acetone bath, which cooled the methylal to $-70°$ C., four mols of hydrogen sulfide and four grams of a 60 percent solution of methylethyl ketone peroxide in dimethyl phthalate were added to the methylal at this temperature. The chloride catalyst (3 grams of $FeCl_3 \cdot 6H_2O$) was added to 112 grams of octene-1 and a precipitate was obtained in a solution comprising the olefin and an iron chloride-olefin complex. The precipitate was removed and the solution added dropwise, in one milliliter increments, to the methylal-hydrogen sulfide solution over a period of about one-half hour. The reaction mixture was stirred for an additional half hour and ten grams of propylenediamine was added to the solution to destroy any remaining peroxides. The reaction mixture was allowed to warm to room temperature and the methylal removed by distillation. The remaining liquid was fractionated and the products recovered. A yield of 27 percent primary octyl mercaptan and eight percent normal dioctyl disulfide was recovered. More than one-half (52 percent) of the octene-1 was recovered unreacted.

The deleterious effect of water of hydration is shown by the decrease in yield of mercaptan and the unfavorable effect on the mercaptan-sulfide ratio in the product.

Example 12

The effect of the physical state of the hydrogen sulfide on the yield was evaluated in a run at room temperature. Octene-1 (112 grams) was placed in a one liter, three-necked flask equipped with stirrer, thermometer, dropping funnel, and gas inlet tube. A charge of four grams of a 60 percent solution of methylethyl ketone peroxide in dimethyl phthalate and three grams of anhydrous ferric chloride were added to the octene-1. A stream of hydrogen sulfide was passed through the solution for a period of two hours while the octene-1 was stirred vigorously. Only a trace of primary octyl mercaptan was recovered. These data indicate that the hydrogen sulfide must be present in the liquid state for the reaction to proceed satisfactorily.

The further effect of the physical state of the hydrogen sulfide on the yield is shown below in Example 13.

Example 13

A charge of 112 grams of octene-1 was placed in a one liter three-necked flask equipped with a stirrer, condenser, thermometer and inlet tube for hydrogen sulfide. The flask was placed in a Dry Ice-acetone bath which was maintained at a temperature of $-53°$ to $-55°$ C. The octene-1 was treated with 3 grams of anhydrous ferric chloride at room temperature before being placed in the flask. The reaction mixture was cooled to $-53°$ C. and then two grams of a 60 percent solution of methylethyl ketone peroxide in dimethyl phthalate was introduced therein. Hydrogen sulfide was passed through the reaction mixture at the rate of 2 mols per hour for one hour at a temperature of $-53°$ to $-55°$ C. At this temperature, of course, no liquid hydrogen sulfide is present, since the boiling point is $-59.6°$ C. at atmospheric pressure. One gram of n-butyl amine was added to destroy the peroxides present. The reaction mixture was distilled and the yield of primary octyl mercaptan was less than one percent. Three additional runs as above were made, except at different temperature levels, namely, $-40°$ to $-45°$ C., $-15°$ to $-35°$ C. and $0°$ C., in which cases the hydrogen sulfide was not in the liquid phase, and in each case less than one percent of primary octyl mercaptan was obtained.

Example 14

Low temperature processes present several operational and economic difficulties, hence the possibility of using high pressure to keep the hydrogen sulfide present in the liquid state was investigated.

A 1000 milliliter Magna Dash Autoclave, stirred by a stirrer paddle moved up and down by a magnetic tension spring mechanism was charged with 195 grams of hydrogen sulfide. The pressure in the autoclave rose to 250 pounds per square inch gauge. A four gram charge of a 60 percent solution of methylethyl ketone peroxide in dibutyl phthalate was added to the autoclave by using nitrogen pressure to overcome the pressure of the liquid hydrogen sulfide. The olefin ferric chloride catalyst charge stock was prepared by adding three grams of anhydrous ferric chloride to 112 grams of octene-1. A precipitate was obtained in a solution comprising the olefin and an iron chloride-olefin complex. The precipitate was removed and the solution was passed into the autoclave in approximately five percent increments at ten minute intervals by using nitrogen pressure to overcome the internal pressure in the autoclave. The pressure in the autoclave was approximately 400 pounds per square inch gauge when all the charge had been added. The temperature remained at $25°$ to $35°$ C. throughout the addition. The reaction mixture was stirred under these conditions for approximately 16 hours. The unreacted hydrogen sulfide was removed by slowly decreasing the pressure to atmospheric, and the liquid product fractionated. The yield of primary octyl mercaptan was 17 percent and the yield of normal dioctyl sulfide five percent based on the 1-olefin content of the octene-1. Approximately 70 percent of the octene-1 was recovered unreacted.

It is apparent from these data that an appreciable yield of primary octyl mercaptan can be recovered if the reaction is run at room temperature and under sufficient pressure to keep the hydrogen sulfide present as a liquid.

Example 15

Cumene hydroperoxide was investigated as an alternative peroxide catalyst in the high pressure system.

The reaction was run as outlined in Example 13 except that five grams of cumene hydroperoxide was substituted for the methylethyl ketone peroxide. The product was separated as before and the yield of 37 percent primary octyl mercaptan and three and five-tenths percent normal dioctyl sulfide was recovered. Approximately 50 percent of the octene-1 was recovered unreacted.

These data indicated the yield of mercaptan can be improved by careful choice of the peroxide catalyst in the high pressure reaction.

Example 16

The effect of placing both the peroxide catalyst and the ferric chloride co-catalyst in the octene-1 was studied. Methylal (200 grams) was charged to a one liter three-necked flask equipped with a stirrer, Dry Ice condenser, thermometer, and dropping funnel. The flask was placed in a Dry Ice-acetone bath, which cooled the methylal to −70° C., and four mols of hydrogen sulfide was added to the methylal at this temperature. The chloride catalyst (3 grams of anhydrous ferric chloride) was added to 112 grams of octene-1 and a precipitate was obtained in a solution comprising the olefin and an iron chloride-olefin complex. This precipitate was removed and four grams of a 60 percent solution of methylethyl ketone peroxide in dimethyl phthalate was added. This octene-1 solution was added dropwise in one milliliter increments to the methylal-hydrogen sulfide mixture over a period of about one-half hour and the reaction mixture was stirred for an additional half hour. The reaction mixture was allowed to warm to room temperature, the methylol removed by distillation, the remaining liquid fractionated and the products recovered. A 43 percent yield of primary octyl mercaptan and a greater than ten percent yield of normal dioctyl sulfide was recovered. Approximately 17.5 percent of the octene-1 was recovered unreacted.

Example 17

In this run diisobutylene was substituted for the octene-1 as the olefin charge material. Four mols of hydrogen sulfide was charged to a one liter three-necked flask equipped with a stirrer, Dry Ice condenser, thermometer, and dropping funnel. The flask had been placed in a Dry Ice-acetone bath, which cooled the hydrogen sulfide to −70° C. Four grams of a 60 percent solution of methylethyl ketone peroxide in dimethyl phthalate was added to the hydrogen sulfide solution. The chloride catalyst (3 grams of anhydrous ferric chloride) was dissolved in 112 grams of diisobutylene and this solution added dropwise in one milliliter increments to the liquid hydrogen sulfide over a period of about one-half hour. The reaction mixture was stirred for an additional half hour. The reaction mixture was allowed to warm up to room temperature, the remaining liquid fractionated and the products recovered. A 25 percent yield of primary and secondary octyl mercaptan was recovered. Approximately 62 percent of the diisobutylene was recovered unreacted.

This experiment shows that other olefins behave as octene-1 does in this reaction. Octene-1 was used as the olefin feed in most of these examples as it is readily available in the laboratory. Any of the other types of olefins mentioned in the specification can be substituted for octene-1 in commercial production and similar results obtained.

The purity of the primary octyl mercaptan prepared was ascertained by preparing the 2,4-dinitrochlorobenzene derivative and comparing the melting point with the known value. In all cases a substantially pure product was recovered from the distillation.

These examples are purely illustrative of preferred embodiments of the invention and I have no intention to limit the invention thereby.

Obviously many modifications and variations of the invention as hereinbefore set forth may be made without departing from the essence and scope thereof and only such limitations should be applied as are indicated in the appended claims.

I claim:

1. A process for the preparation of a mercaptan which comprises adding anhydrous iron chloride to an olefin and thereafter reacting said olefin with hydrogen sulfide by incrementally adding the solution of iron chloride and olefin to excess liquid hydrogen sulfide and an organic peroxide.

2. A process for the preparation of a mercaptan which comprises adding anhydrous iron chloride to an olefin and thereafter reacting said olefin with hydrogen sulfide by incrementally adding the solution of iron chloride and olefin to excess liquid hydrogen sulfide and methylethyl ketone peroxide.

3. A process for the preparation of a mercaptan which comprises adding anhydrous iron chloride to an olefin and thereafter reacting said olefin with hydrogen sulfide by incrementally adding the solution of iron chloride and olefin to excess liquid hydrogen sulfide and cumene hydroperoxide.

4. A process for the preparation of a mercaptan which comprises adding anhydrous iron chloride to octene-1 and thereafter reacting said octene-1 with hydrogen sulfide by incrementally adding the solution of iron chloride and octene-1 to excess liquid hydrogen sulfide and an organic peroxide.

5. A process for the preparation of a mercaptan which comprises adding anhydrous iron chloride to octene-1 and thereafter reacting said octene-1 with hydrogen sulfide by incrementally adding the solution of iron chloride and octene-1 to excess liquid hydrogen sulfide and methylethyl ketone peroxide.

References Cited in the file of this patent

UNITED STATES PATENTS

| | | |
|---|---|---|
| 2,052,268 | Williams et al. | Aug. 25, 1936 |
| 2,352,435 | Hoeffelman et al. | June 27, 1944 |
| 2,443,852 | Eaton et al. | June 22, 1948 |
| 2,531,602 | Bell | Nov. 28, 1950 |